United States Patent [19]
Miller, III et al.

[11] 3,909,772
[45] Sept. 30, 1975

[54] EXPENDABLE VOLUME REVERBERATION PROFILER

[75] Inventors: Ralph R. Miller, III, Seattle, Wash.; Donald D. Abraham, Old Lyme, Conn.

[73] Assignee: The United States of America as represented by the Secretary of the Navy, Washington, D.C.

[22] Filed: May 31, 1974

[21] Appl. No.: 475,333

[52] U.S. Cl. .................. 340/3 R; 73/170 A; 73/554; 340/5 R
[51] Int. Cl.² ..................... G01S 9/66; H04B 11/00
[58] Field of Search .......... 73/170 A, 554; 340/3 A, 340/3 R, 5 C, 5 R

[56] References Cited
OTHER PUBLICATIONS
Nichols, Jr., The Journal of the Acoustical Society of America, Vol. 39, No. 4, April 1966, pp. 757–759.

Primary Examiner—Richard A. Farley
Attorney, Agent, or Firm—Richard S. Sciascia; Arthur A. McGill; Prithvi C. Lall

[57] ABSTRACT

An expendable volume reverberation profiler comprising an acoustic transmitter-receiver unit and the associated telemetry section which is hard wired to a point at the surface of the ocean. The transmitter-receiver unit is allowed to fall freely through the ocean and an acoustic signal is transmitted through the water while the receiver section is blanked out. The acoustic information received later by the receiver section is telemetered to the surface to develop a volume reverberation profile.

4 Claims, 5 Drawing Figures

EXPENDABLE VOLUME REVERBERATION PROFILER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to volume reverberation measurements in a fluid and more specifically to an expendable volume reverberation profiler. When acoustic energy is incident upon a medium like body of water such as an ocean, a number of inhomogeneities, e.g., dust particles, air bubbles and marine life suspended inside the medium form discontinuities in the physical properties of the medium and thereby intercept and re-radiate a portion of the acoustic energy incident upon them. This re-radiation of the acoustic energy is called scattering, and the sum total of the scattering contributions from all the suspended scatterers is called volume reverberation. It is heard as a long, slowly decaying, quivering tonal blast following the ping of an active sonar system, and is particularly obnoxious in systems of high power and/or low directivity. Since it often forms the primary limitation on system performance, a necessary part of the design process of new active sonars is to make an estimate of the reverberation level to be encountered under the operating conditions for the system.

Volume reverberation has been measured in the past by various methods, e.g., the shot method using an explosive source and the CW method using a single frequency projector. The shot method analyzes the acoustic returns from a high explosive charge by means of a hydrophone suspended in the water column. This method gives the so-called integrated volume scattering strength which is usually taken to be the volume scattering strength value integrated over the entire water column. This volume scattering strength is then compared with the signal generated by the explosive source and the integrated volume reverberations is calculated therefrom. The CW method involves high powered sonar heads which transmit accoustic signals downward into the water column. The acoustic returns caused by volume scattering are then compared with the strength of the incident acoustic signal and the ratio of the two is expressed as the volume reverberation. This method allows a profile of volume reverberation to be developed as a function of depth since the time delay between the transmitted signal and the received signal is a function of depth. However, in order to measure volume reverberation near the surface, very large and unwieldly upward looking acoustic transmitters need be used. Such accoustic transmitters require nearly calm seas and complex operations. It is thus desirable to have a volume reverberation profiler which is easy to operate and which quickly measures the values of volume reverberation in the area under test.

SUMMARY OF THE INVENTION

The objects and advantages of the present invention are accomplished by utilizing an expendable volume reverberation profiler which comprises a transducer, a transmitter section, a receiver section, an adjustable timing circuit, time delay circuits, a switching circuit and a signal processing circuit. A signal is generated by the adjustable timing circuit which energizes a first time delay circuit to produce electrical pulses of a fixed duration. The output of the adjustable timing circuit also energizes a second time delay circuit which produces electrical pulses of duration longer than those of the first time delay circuit. The output of the first time delay circuit activates a gated oscillator to produce tonal bursts of a preselected frequency which are amplified to a power amplifier and are fed to a transducer acting as a projector via a transformer and a switching relay. The switching relay is energized by means of a FET (Field Effect Transistor) switch which is energized by the output of the second time delay circuit. The relay switch then turns on the receiver section allowing the transducer to act as a hydrophone and changing the system from transmit mode to receive mode. The output of the hydrophone is amplified and bandpass filtered and full wave rectified. The signal is then integrated over the pulse duration by an operational amplifier integrator to obtain the value of volume reverberation at a point in the water, the depth of which is a function of the rate of fall of the profiler through water. The value of volume reverberation is then converted to a frequency by a voltage control oscillator and telemetered to the surface. The volume reverberation estimates thus developed are plotted as a function of depth thereby producing the volume reverberation profile. Alternatively, the output of the full wave rectifier may be telemetered to the surface by using a light source and a photocell to determine volume reverberation profiles. One object of this invention is to provide an expendable volume reverberation profiler to measure volume reverberation in situ.

Another object of this invention is to provide a volume reverberation profiler which is easy to operate.

Still another object of this invention is to provide a volume reverberation profiler which determines volume reverberation profiles in a quick fashion and at a moderate cost.

Still another object of this invention is to provide a volume reverberation profiler which does not depend on calm seas for its operation and which is simple to operate.

Other objects, advantages and novel features of the invention will become apparent from the following detailed description of the invention when considered in conjunction with the accompanying drawings wherein:

DESCRIPTION OF A PREFERRED EMBODIMENT

Figure 1:
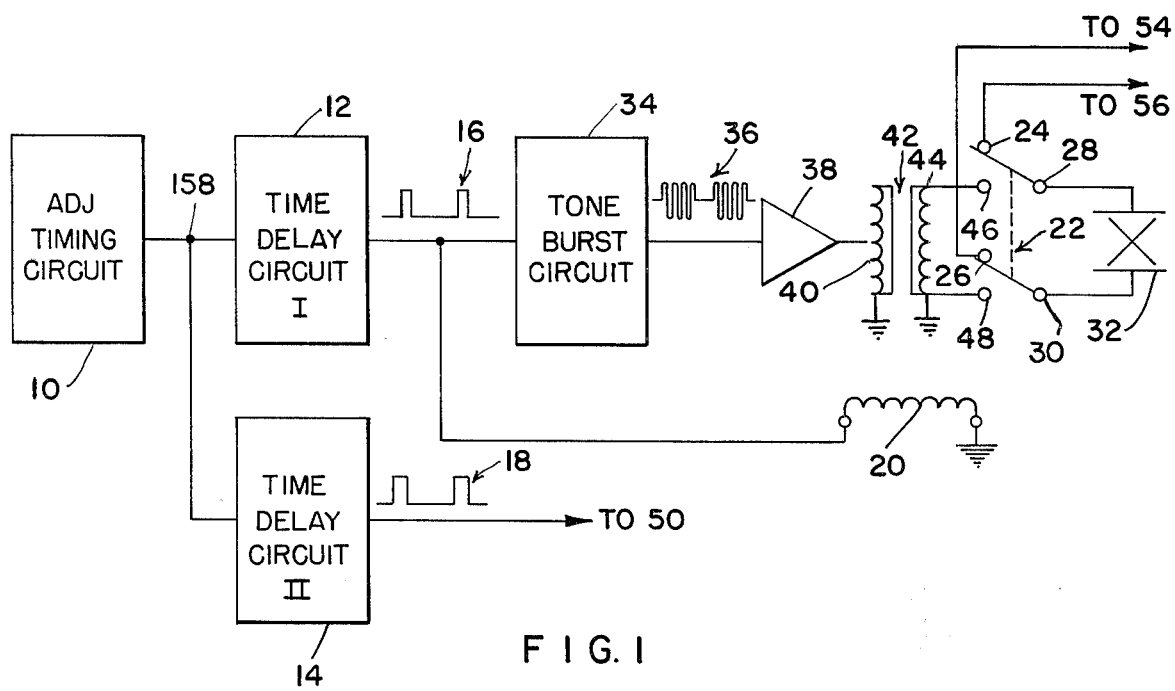
FIG. 1 shows a block diagram of the volume reverberation profiler.
Figure 2:
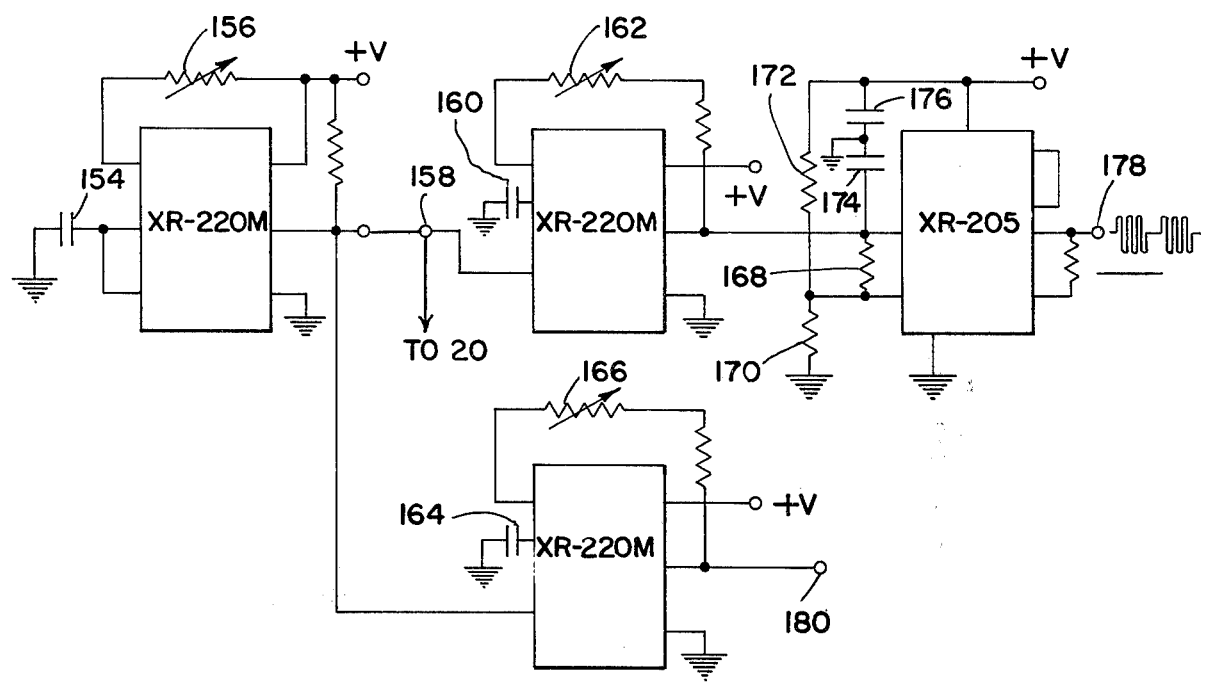
FIG. 2 shows additional details of adjustable timing circuit, time delay circuits and tone burst circuit of FIG. 1.

Referring to the drawings wherein like reference characters designate identical or corresponding parts in various figures, and more particularly to the first figure thereof, FIG. 1 shows the block diagram of a volume reverberation profiler according to the teachings of subject invention. As shown in FIG. 1, an adjustable timing circuit 10 provides a pulse at a certain preselected rate. As an example, adjustable timing circuit 10 is set to generate one pulse every three seconds. The output of circuit 10 is fed to time delay circuits 12 and 14 simultaneously, generating pulse trains 16 and 18 respectively. The duration of each pulse of pulse train 18 is adjusted to be longer than the duration of each pulse of pulse train 16. Pulse train 16 is applied to energize coil 20 of relay switch 22 which has its terminals 24 and 26 connected to terminals 28 and 30 of transducer 32. Pulse train 16 is also used to energize tone burst circuit 34 which generates an output in the form of pulse train 36 which comprises pulses of frequency preferably between 3 and 4 kHz and the duration of pulse train 36 is the same as the duration of each of the pulses of pulse train 16. Pulse train 36 is fed into a standard power amplifier 38, the output of which is fed to the primary 40 of transformer 42, the secondary 44 of which is connected across terminals 46 and 48 of relay switch 22. Pulse train 18 is fed to terminal 50 of FET switch 52 and is used to activate switch 52. Terminals 24 and 26 of FIG. 1 are connected to terminals 54 and 56 respectively of FIG. 3.

Figure 3:
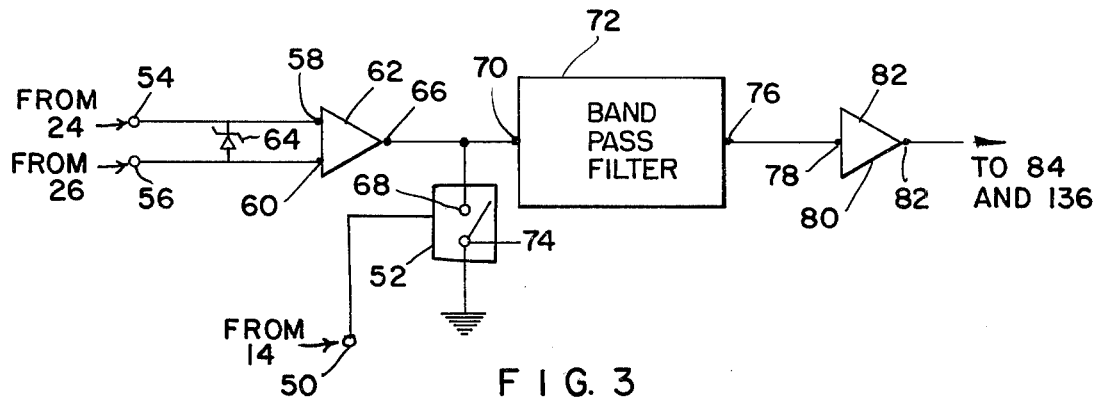
FIG. 3 shows the part of the receiving section of the profiler.
Figure 4:
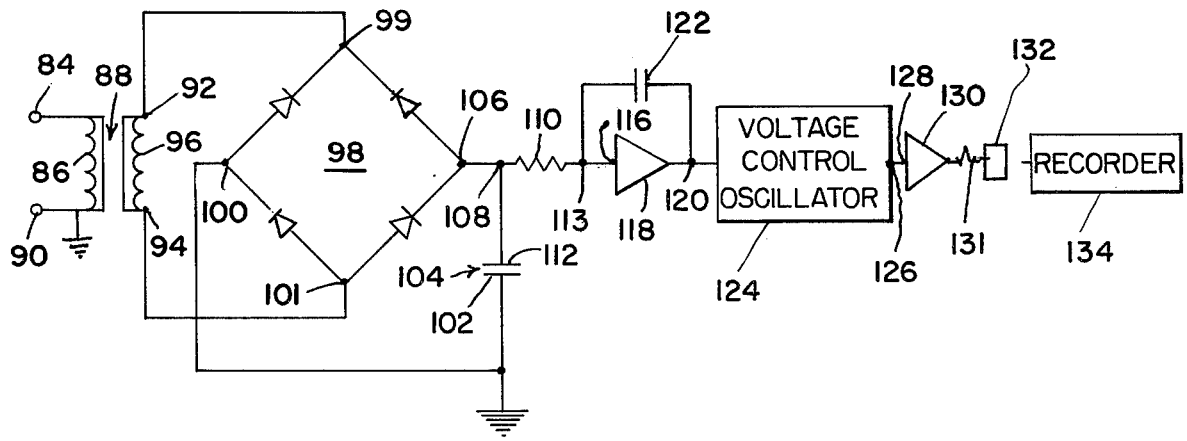
FIG. 4 shows the signal processing section of the volume reverberation profiler.

As shown in FIG. 3, terminals 54 and 56 in turn are connected to the input terminals 58 and 60 of amplifier 62 and a zener diode 64 is connected across terminals 54 and 56. Output terminal 66 of amplifier 62 is connected to terminal 68 of FET switch 52 and to the input terminal 70 of bandpass filter 72. Terminal 74 of FET switch 52 is connected to ground. Output terminal 76 of bandpass filter 72 is connected to input terminal 78 of amplifier 80 which has its output terminal 82 connected to terminals 84 and/or 136. Terminals 84 and 136 are one end of the primary coils 86 and 138 respectively, with terninal 90 of primary 86 being connected to ground. Terminals 92 and 94 of secondary 96 are connected to terminals 99 and 101 of bridge circuit 98 as shown in FIG. 4. Terminal 100 of bridge circuit 98 is connected to ground and to terminal 102 of capacitor 104. Terminal 106 of bridge circuit 98 is connected to terminal 108 of resistor 110 and to terminal 112 of capacitor 104. Terminal 113 of resistor 110 is connected to input terminal 116 of amplifier 118 and output terminal 120 of amplifier 118 through capacitor 122. Terminal 120 is connected to the input terminal of a voltage control oscillator 124 which has its output terminal 126 connected to input terminal 128 of amplifier 130. Output terminal of amplifier 130 is connected to the input terminal of a demodulator 132 which has its output terminal connected to a recorder 134.

Figure 5:
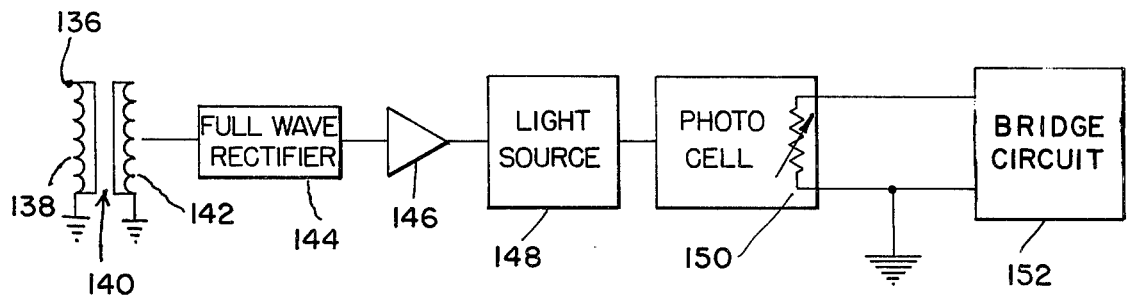
FIG. 5 shows an alternative arrangement of the signal processing section of the volume reverberation profiler.

As shown in FIGS. 3 and 5, in a different embodiment, terminal 82 is also connected to terminal 136 of primary 138 of transformer 140 which has its secondary 142 connected to a full wave rectifier 144 which is similar to rectifier circuit 98. The output of rectifier 144 is amplified by amplifier 146 and is used to control the intensity of a light source 148. The intensity of light source 148 is used to vary the resistance of photocell 150 which acts as a one arm of a bridge circuit 152 aboard a ship.

OPERATION OF THE CIRCUIT

Adjustable timing circuit 10 and time delay circuits 12 and 14 are basically monolithic timing circuits such as Model XR-220M made by EXAR Company. Adjustable timing circuit 10, for example, is an XR-220M unit which is modified for it to run as a free running multivibrator and produces a pulse after every preselected time interval which is controlled by capacitor 154 and a variable resistor 156. As an example, the values of capacitor 154 and resistor 156 are such that the output at terminal 158 is a square wave pulse of short duration generated every 3 seconds. The output of adjustable timing circuit at terminal 158 is simultaneously applied as an input to time delay circuits 12 and 14 to generate pulse trains 16 and 18 as their respective outputs. Capacitor 160 and resistor 162 control the duration of each pulse of pulse train 16 which is preferably set at 20 milliseconds. The duration of each pulse train 18 is controlled by capacitor 164 and resistor 166 and preferably has a value of 25 milliseconds, i.e., 5 milliseconds longer than the duration of each of pulse train 16.

When circuits 10, 12 and 14 are inactive, relay switch 22 is in receive mode, i.e., terminals 28 and 30 of transducer 32 are connected to relay terminals 24 and 26 respectively which in turn are connected to terminals 54 and 56 respectively of FIG. 3. In that mode transducer 32 acts as a hydrophone and feeds its output to the receiving section shown in either FIGS. 3 and 4 or FIGS. 3 and 5. When power of voltage pulse V from a sea battery is applied to circuits 10, 12, 14 and 34, adjustable timing circuit 10 starts running in a free mode generating square wave pulses of short duration such as 5 to 10 milliseconds, preferably every three seconds. The output of circuit 10 then energizes circuits 12 and 14 simultaneously generating pulse trains 16 and 18. Durations of pulses in pulse trains 16 and 18 are 20 milliseconds and 25 milliseconds respectively. Pulses of pulse train 16 energize tone burst circuit 34, a unit such as Model XR205 by EXAR Company or its equivalent, and also activate relay coil 20 of relay switch 22. Tone burst circuit 34 generates a carrier signal of frequency, preferably between 3 and 4 kHz, which is determined by resistors 168, 170 and 172 and capacitors 174 and 176 so as to generate pulse train 36 at terminal 178, the duration of each pulse of which is the same as the duration of pulse train 16, i.e., 20 milliseconds. Pulse train 16 switches terminals of relay switch 22 from terminals 24 and 26 to terminals 46 and 48 respectively during the duration of pulse train 16 and thus places transducer 32 in transmit mode for a time duration equal to the duration of the pulse train 16, i.e., 20 milliseconds. Pulse train 18 which is generated at the same time by time delay circuit 14 at terminal 180 thereof, is fed to terminal 50 of coil 182 of FET switch 52 such as RCA Model CD4016AE. The duration of each pulse of pulse train 18 is adjusted to be longer than the duration of each pulse of pulse train 16. As an example, it is set at 25 milliseconds in case pulse train 16 is set at 20 milliseconds. Pulse train 18 thus closes FET switch 52 for 25 milliseconds thus grounding the output terminal of amplifier 62. After 25 milliseconds from the time of the start of pulse train 18, FET switch 52 opens and allows the output of amplifier 62 to go to a three pole active bandpass filter 72 for further processing. In the meantime, before the output of amplifier 62 becomes ready to be applied to bandpass filter 72, coil 20 of relay switch 22 is de-energized and terminals 28 and 30 are connected to terminals 24 and 26 respectively which are connected to respective terminals 54 and 56 of FIG. 3, thus providing input signal to amplifier 62. Because of the time durations of pulses of pulse trains 16 and 18, there is a certain time interval which is 5 milliseconds in the example cited, for which the receiving section of FIGS. 3, 4 and 5 is inoperative. This allows any ringing from transducer 32 to decay after it completes its transmit mode cycle. Transducer 32 stays in receive mode until the next group of pulses from pulse train 16 and pulse train 36 arrive to put the transducer in the transmit mode again. A zener diode 64 is connected across terminals 54 and 56 to protect amplifier 62 from transient high voltage from the relay switch. Output of amplifier 62 at terminal 66 is supplied to terminal 70 of bandpass filter 72 which is preferably a three pole active bandpass filter. The output of filter 72 is then amplified by operational amplifier 80, the output of which at terminal 82 thereof is then used for signal conditioning and telemetry using circuits of FIGS. 4 and 5 which show two different arrangements for signal conditioning.

FIG. 4 shows signal conditioning circuit wherein output of amplifier 80 at terminal 82 is applied to terminal 84 of the primary 86 of transformer 88. Terminals 92 and 94 of secondary 96 of transformer 88 are connected to a full wave rectifier 98 as shown in FIG. 4. The output of rectifier 98 is further filtered by capacitor 104 and is then integrated by integrator 118. The integrated output at terminal 120 is then used to energize voltage control oscillator 124 such as manufactured by Intersil Co., Model 8038 or equivalent thereof, which puts out a signal of frequency proportional to the D.C. level of the output signal at terminal 120. The output of voltage control oscillator 124 is then amplified by amplifier 130 for transmission over the wire link 131. The output of the wire link 131 aboard the ship is demodulated by demodulator 132. The output of demodulator 132 is then recorded on a recorder 134 for analyzing the amount of reflected acoustic energy by the scatterers surrounding the volume around the profiler. Alternatively, output at terminal 82 in FIG. 3 is applied to the primary 138 of transformer 140 and the secondary terminals of transformer 140 are connected to full wave rectifier 144 in a manner which is similar to that of FIG. 4. The output of full wave rectifier 144 is amplified by amplifier 146 and is then applied to a light source 148 to control its light intensity. Light intensity of source 148 changes the resistance of photocell 150 which forms a part of a bridge circuit 152 at a distance point such as aboard a ship. The resistance variations of photocell 150 are then used to find out the amount of reflected acoustic energy reaching the transducer. This procedure is similar to the one followed in the Sippian XBT system. It should be noted that all components used in the profiler according to the teachings of this invention are conventional. As an example, units 10, 12 and 14 are XR-220M by EXAR Company or equivalent thereof. Unit 34 uses a gate oscillator such as XR-205 by EXAR Company or its equivalent thereof. The remaining components are conventional and they can be replaced by units made by different manufacturers.

Briefly stated, in an expendable volume reverberation profiler according to the teachings of this invention, a transducer is made to operate in two modes, i.e., transmit mode and a receive mode. During the transmit mode acoustic energy is transmitted by the profiler as it is moving downward in the water for a certain time interval. After transmission of acoustic energy, a certain time is allowed to elapse to avoid ringing effect before the transducer is made to operate in receive mode. The acoustic energy reflected by the scatterer around the profiler is then measured to correlate it with volume scattering strength.

Obviously many modifications and variations of the present invention are possible in the light of the above teachings. As an example, two separate transducers, one for transmitting acoustic energy and another for receiving acoustic energy, can be used. Furthermore, the received acoustic energy can be measured in any other way. It is therefore understood that within the scope of the appended claims, the invention may be practiced otherwise than as specifically described.

We claim:

1. An expendable volume reverberation profiler comprising:

an acoustic transducer:

switching means being connected to said transducer;

a transmitter section being detachably connected to said transducer via said switching means, said transmitter including an adjustable timing circuit for generating electrical pulses at a preselected rate, a first delay circuit for generating a first pulse train from said electrical pulses and a second delay circuit for generating a second pulse train with each pulse thereof having duration longer than that of each of the pulses of said first pulse train;

a receiver section being detachably connected to said transducer via said switching means; and a power source for providing power to said transmitter and receiving sections, and said switching means.

2. The volume reverberation profiler of claim 1 wherein said transmitter section further includes a tone burst circuit being energized by said first pulse train.

3. The volume reverberation profiler of claim 2 wherein the receiving section comprises a rectifier and a voltage control oscillator.

4. The volume reverberation profiler of claim 3 wherein said receiving section includes a light source and a photo cell forming a part of a bridge circuit.

* * * * *